United States Patent [19]
Clopton

[11] Patent Number: 5,467,860
[45] Date of Patent: Nov. 21, 1995

[54] CHAIN FOR ACCUMULATING CONVEYOR

[75] Inventor: Robert T. Clopton, Magnolia, Ky.

[73] Assignee: Tekno, Inc., Cave City, Ky.

[21] Appl. No.: 316,943

[22] Filed: Oct. 3, 1994

Related U.S. Application Data

[63] Continuation-in-part of Ser. No. 203,445, Feb. 28, 1994, Pat. No. 5,409,096, which is a continuation-in-part of Ser. No. 968,584, Oct. 29, 1992, Pat. No. 5,314,059.

[51] Int. Cl.⁶ .................................................. B65G 17/24
[52] U.S. Cl. ............................................................ 198/779
[58] Field of Search ............................................. 198/779

[56] References Cited

U.S. PATENT DOCUMENTS

| | | | |
|---|---|---|---|
| 3,701,413 | 10/1972 | Leahy et al. | 198/779 |
| 4,339,030 | 7/1982 | Hirata | 198/779 |
| 4,736,834 | 4/1988 | Kotegawa et al. | 198/779 |
| 5,035,318 | 7/1991 | Kawabata et al. | 198/779 |

FOREIGN PATENT DOCUMENTS 6144534  5/1994  Japan ...................................... 198/779

Primary Examiner—James R. Bidwell
Attorney, Agent, or Firm—Camoriano & Smith

[57] ABSTRACT

A conveyor chain carries products at a speed which is higher than the speed at which the chain moves and provides a low backline pressure when it accumulates products. The product-carrying roller is driven by two side rollers which run on rails on the conveyor frame.

4 Claims, 2 Drawing Sheets

CHAIN FOR ACCUMULATING CONVEYOR

This is a continuation-in-part of U.S. patent application Ser. No. 08/203,445, filed Feb. 28, 1994, U.S. Pat. No. 5,409,096 which is a continuation-in-part of U.S. Patent application Ser. No. 07/968,584, filed Oct. 29, 1992, now U.S. Pat. No. 5,314,059.

BACKGROUND OF THE INVENTION

The present invention relates to conveyor chain, and, in particular, to a conveyor chain which can convey products at a faster speed than the speed at which the chain is travelling.

U.S. Pat. No. 4,736,834 "Kotegawa" shows a conveyor chain which is intended to be used to carry products at a faster speed than the chain is travelling. It does this by driving the center roller 1, which supports products, with side rollers 2, which ride on tracks. As the chain travels, the side rollers 2 roll along the tracks. The side rollers 2 contact the center roller 1 along their inside diameter and along a side face. This provides good surface contact for driving the center roller 1. However, it also creates a problem.

One of the purposes of this type of chain is that its parts should be able to slip relative to each other in order to accumulate products on the conveyor without creating a high backline pressure. A high backline pressure means that products are pushing against each other with a large force, which tends to damage the products and/or increase the amount of energy needed to drive the conveyor. The large surface area of contact between the side rollers and the center roller, both on side surfaces and inner surfaces, provides for a large friction force between the side rollers and the center roller, which means that this chain can build up a relatively large backline pressure before the center rollers begin to slip relative to their side rollers.

SUMMARY OF THE INVENTION

The present invention provides a chain which has the advantages of the Kotegawa chain, plus, because of its configuration, its center roller, or product roller, slips before creating a large backline pressure.

The chain of the present invention provides for a lower backline pressure than the chain design taught by Kotegawa, because the side rollers in the present invention only contact the center roller on a side face.

DESCRIPTION OF THE PREFERRED EMBODIMENT

Figure 1:
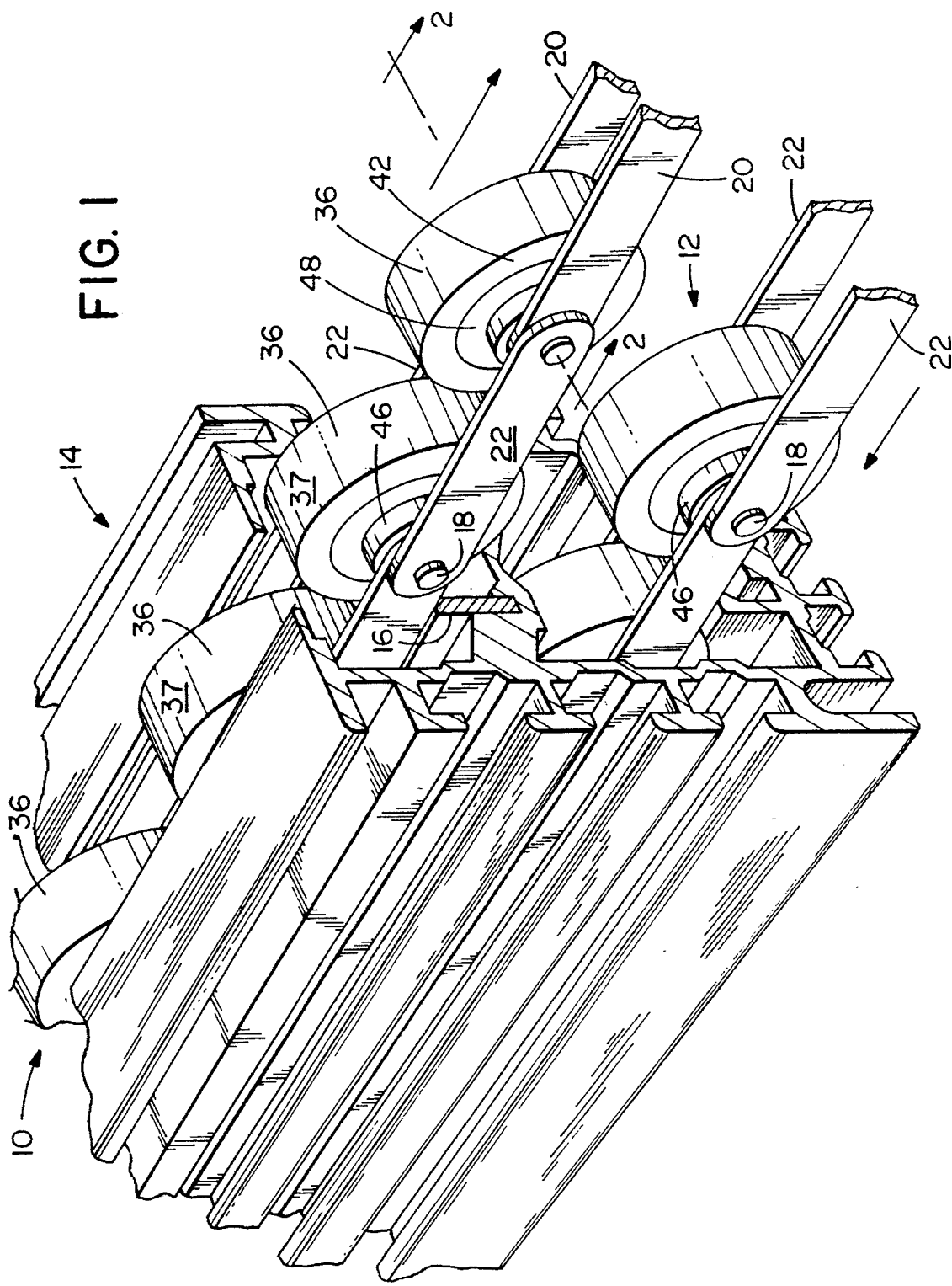
FIG. 1 is a perspective view of a conveyor using the chain of the present invention, with the frame of the conveyor shown in section.

FIG. 1 shows a conveyor in which a chain made in accordance with the present invention is mounted. The upper run 10 of the chain is used to carry products, and the lower run 12 of the chain returns to the end of the conveyor inside the conveyor frame 14. The frame 14 includes rails 16 on which the chain runs. This frame is described in more detail in my U.S. Pat. Nos. 5,314,059 and 5,328,020, which are hereby incorporated by reference.

Figure 2:
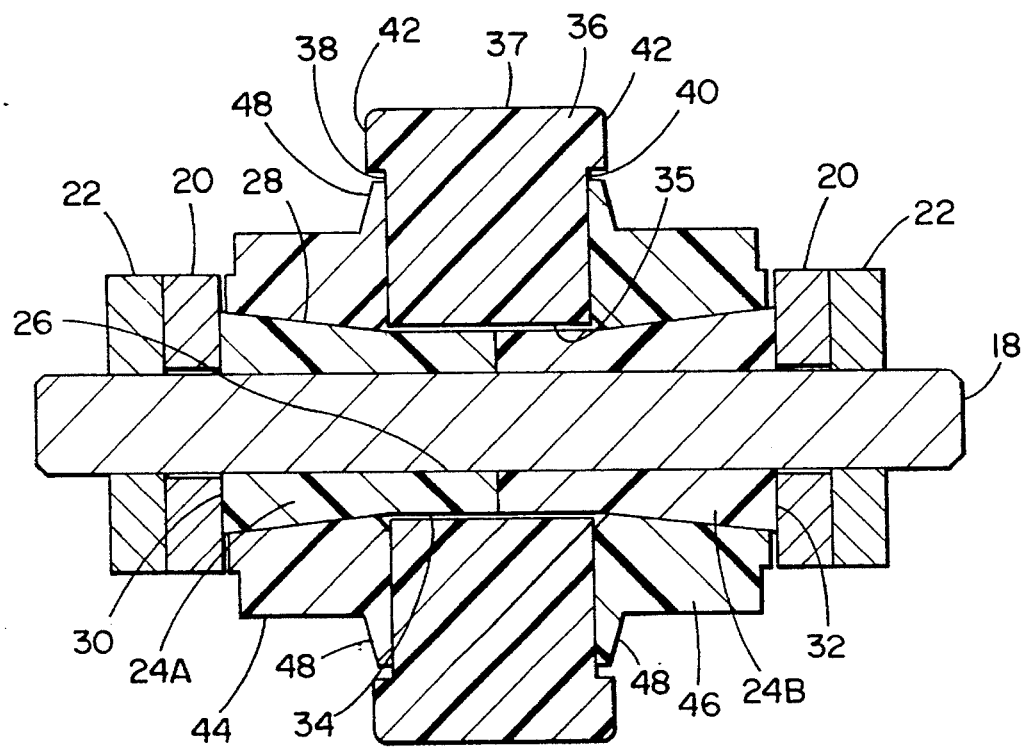
FIG. 2 is a view taken along the section 2—2 of FIG. 1.
Figure 3:
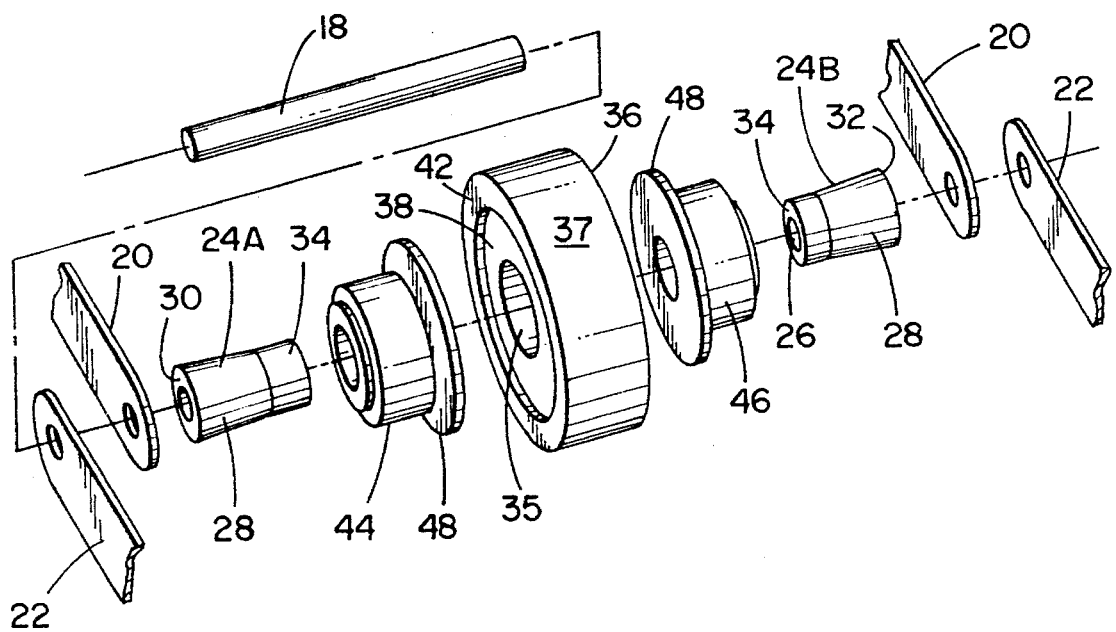
FIG. 3 is an exploded perspective view of a portion of the chain.

FIG. 2 shows a cross-section view of the chain. The chain includes a plurality of pins 18 which interconnect respective first and second inner sidebars 20 and first and second outer sidebars 22. The inner sidebars 20 are mounted loosely over the pin 18 so they can pivot relative to the pin 18. The outer sidebars 22 are press fit onto the ends of the pin 18, so they do not move relative to the pin 18.

The chain also includes a two-piece inner sleeve 24A–24B, which is mounted over the pin 18. The two-piece inner sleeve will hereafter be referred to with the number 24. The inner sleeve 24 has a cylindrical inner surface 26 which fits over the cylindrical outer surface of the pin 18. In operation, the inner sleeve 24 generally does not move relative to the pin. The outside surface 28 of the inner sleeve 24 is tapered, so it has a larger outside diameter near the first and second ends 30, 32. The center portion 34 of the outside diameter of the inner sleeve 24 is cylindrical, so that it can receive the cylindrical inner surface 35 of the product roller 36 with a slip fit.

The product roller 36 has a large outside diameter, so that its outer surface 37 projects above the conveyor frame, as shown in FIG. 1, to carry products along the conveyor. The product roller 36 has flat, recessed first and second side surfaces 38, 40 which are circular in shape and which are surrounded by the product roller flanges 42. First and second rail rollers 44, 46 are mounted on the inner sleeve 24 adjacent to the first and second side surfaces 38, 40 of the product roller 36. Each of the rail rollers 44, 46 preferably has a flange 48, which abuts its respective side surface 38 or 40. The flange 48 provides guidance and provides an increased surface area of contact between the rail roller and the product roller. (The flange 48 is not required in order for the chain to work.) When the rail rollers rotate, they transmit force to the product roller by pressing against the side surfaces 38, 40, causing the product roller to rotate.

The rail rollers 44, 46 have a tapered inner surface which is at a supplementary angle to the angle of taper of the inner sleeve 24. This angle urges the rail rollers 44, 46 against the sides 38, 40 of the product roller 36, and the amount of force transmitted from the rail rollers to the product roller can be controlled by controlling the angle of taper.

The chain is assembled as follows:

Each half of the inner sleeve 24 is inserted into its respective rail roller 44 or 46, and the rail rollers 44, 46 are put into place at their respective sides of the product roller 36. Then the chain pin 18 is inserted through the inner sleeve 24. When two of these roller assemblies have been made up, the inner sidebars 20 are mounted over the ends of the two pins 18. When two of these inner sidebar and roller assemblies have been made up, the outer sidebars 22 are pressed onto the ends of a forward pin 18 of one assembly and a rear pin 18 of an adjacent assembly. As this process is repeated, the chain is formed.

The operation of the chain is as follows:

When the chain is running in the frame 14, driven by a sprocket (not shown), the rail rollers 44, 46 roll along the rails 16 of the frame. The angle of taper on the inner sleeve 24 and the rail rollers 44, 46 causes the rail rollers 44, 46 to press against the side surfaces 38, 40 of the product roller 36, which causes the product roller 36 to rotate. This causes the products, which are carried on the product roller 36, to move at a speed which is faster than the chain speed. They move at a speed which is the chain speed plus the speed of rotation of the product rollers.

If there is a blockage somewhere along the conveyor, and products begin to accumulate, the product rollers 36 are free to rotate backwards relative to the chain pins 18, so as to keep the products stationary as the chain moves underneath the products. The force which the product rollers 36 must overcome in order to keep the products stationary, or to accumulate products, is primarily the force exerted by the rail rollers 44, 46 on the side faces 38, 40. Thus, the chain of the present invention permits accumulation without creating a large backline pressure on the products, and the amount of backline pressure can be controlled by controlling the angle of taper between the inner sleeve 24 and the rail rollers 44, 46.

What is claimed is:

1. A link for a conveyor chain, comprising:

a connecting pin having a center and first and second ends;

an inner sleeve mounted over said pin; said inner sleeve having a tapered outer surface;

a large diameter product roller mounted over said inner sleeve near the center of the pin, said large diameter product roller having an outside surface for carrying products, an inside surface, and first and second side surfaces;

first and second rail rollers mounted over said inner sleeve adjacent to said first and second side surfaces of said product roller, respectively, said first and second rail rollers having tapered inside diameters with a shape that supplements the tapered outer surface of the inner sleeve, so that the supplementary tapered surfaces on the inner sleeve and the rail rollers urge the first and second rail rollers against the first and second side surfaces of the product roller, respectively.

2. A link for a conveyor chain as recited in claim 1, wherein said inner sleeve is made in two pieces.

3. A link for a conveyor chain as recited in claim 2, and further comprising first and second inner link sidebars pivotably mounted over said pin outside of the inner sleeve; and first and second outer link sidebars press fit on said pin outside of the first and second inner link sidebars, respectively.

4. A conveyor, comprising:

a frame, including first and second parallel rails and a top surface;

a chain mounted on said frame, said chain including:

a plurality of connecting pins, each having a center and first and second ends;

an inner sleeve mounted over each of said pins; said inner sleeve having a tapered outer surface;

a large diameter product roller mounted over each of said inner sleeves near the center of its pin, said large diameter product roller having an outside surface for carrying products, an inside surface, and first and second side surfaces;

first and second rail rollers mounted over each of said inner sleeves adjacent to said first and second side surfaces of said product roller, respectively, said first and second rail rollers having tapered inside diameters with a shape that supplements the tapered outer surface of the inner sleeve, so that the supplementary tapered surfaces on the inner sleeve and the rail rollers urge the first and second rail rollers against the first and second side surfaces of the product roller; said first and second rail rollers being supported by said parallel rails, and said product rollers projecting above the top surface of said frame.

* * * * *